2 Sheets—Sheet 1.

F. LAPPIN,

Assignor, by mesne assignments, to E. M. MARTER and G. W. MARTER.

SAFETY DOOR FOR RAILROAD CAR PLATFORMS.

No. 10,709. Reissued Apr. 6, 1886.

Attest
E. M. Breckinridge
J. L. Maguire

Inventor
Frank Lappin
By his atty
[illegible]

2 Sheets—Sheet 2.

F. LAPPIN,

Assignor, by mesne assignments, to E. M. MARTER and G. W. MARTER.

SAFETY DOOR FOR RAILROAD CAR PLATFORMS.

No. 10,709. Reissued Apr. 6, 1886.

Witnesses
E. M. Bruckmann
J. L. Maguire

Inventor.
Frank Lappin
By his Atty.
[illegible]

UNITED STATES PATENT OFFICE.

FRANK LAPPIN, OF WILMINGTON, DELAWARE, ASSIGNOR, BY MESNE ASSIGNMENTS, TO E. M. MARTER AND GEORGE W. MARTER.

SAFETY-DOOR FOR RAILROAD-CAR PLATFORMS.

SPECIFICATION forming part of Reissued Letters Patent No. 10,709, dated April 6, 1886.

Original No. 291,363, dated January 1, 1884. Application for reissue filed January 9, 1886. Serial No. 188,107.

*To all whom it may concern:*

Be it known that I, FRANK LAPPIN, a citizen of the United States, and a resident of Wilmington, Delaware, and formerly of Baltimore, Maryland, have invented certain Improvements in Safety-Doors for Railroad-Car Platforms, of which the following is a specification.

My invention relates to safety doors or gates for preventing the egress of passengers from and their access to railway-cars until a train has stopped, my invention consisting, first, in combining sliding doors with the body, platform, and steps of a car in such a manner that the doors can be closed to prevent access to or egress from the car, or can be moved out of the way to a position close to the sides of the car; second, in combining the said doors with mechanism which permits them to be opened or closed by compressed air or water under pressure; and, third, in so combining the said doors with yielding steps and a bolt that the weight of passengers ascending and descending the steps will prevent the doors from being closed.

Figure 1:
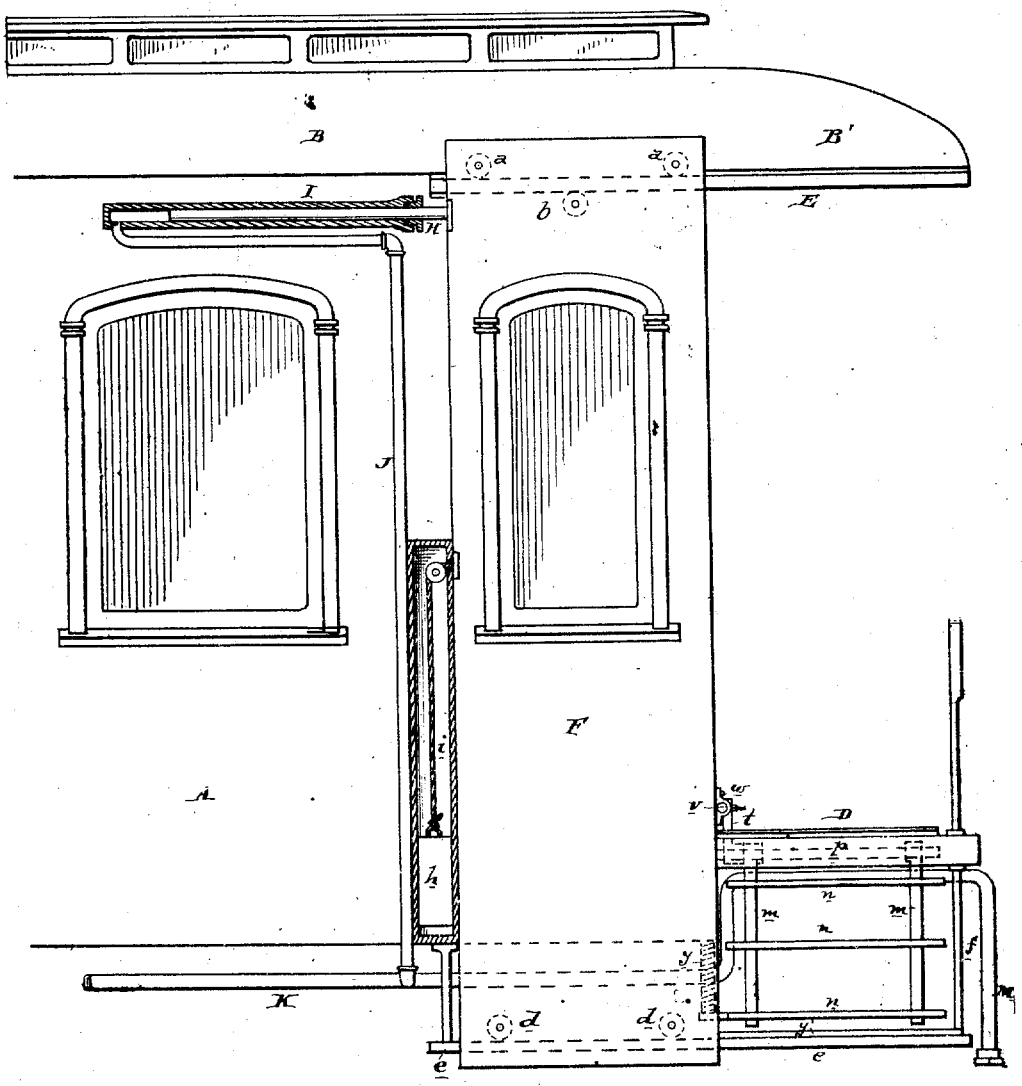
Figure 2:
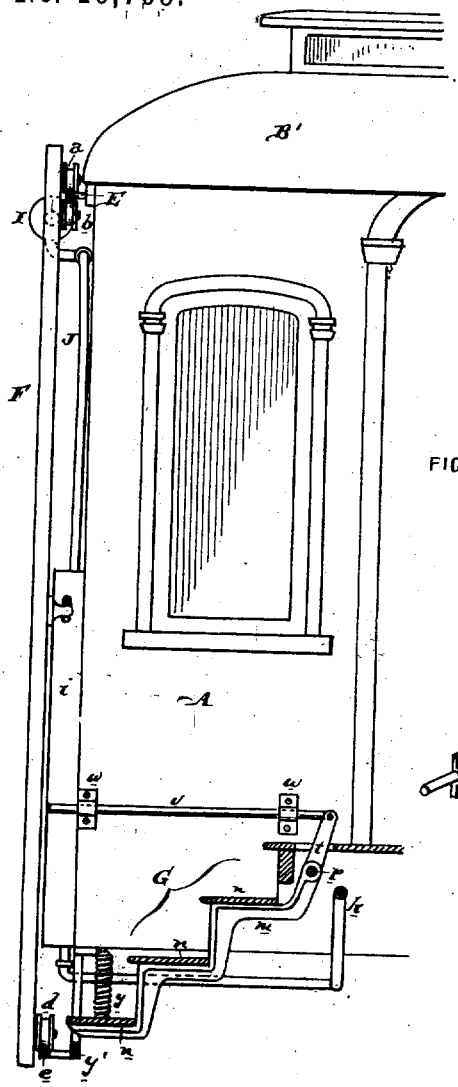

In the accompanying drawings, Figure 1, Sheet 1, is a side view of part of a railroad-car with platform-door; Fig. 2, Sheet 2, a view of a portion of one end of the car, showing the platform and platform-steps in section, and illustrating my invention; and Fig. 3, a perspective view of the steps and appliances connected therewith.

A is a portion of a railroad-car, and B the roof, which, as usual, is extended to form a hood, B′, projecting over the platform D of the car. A rail, E, is secured at one end to the side of the car near the roof, and extends along the edge of the hood B′, and is secured to the latter in any suitable manner. From this rail is suspended the sliding door F, provided with grooved rollers *a*, adapted to the rail, vertical displacement of the door being prevented by a lower roller, *b*. To steady the lower end of the door, I provide it with two flanged rollers, *d*, adapted to a rail, *e*, which is connected at one end by a rod, *f*, or other suitable attachment to the platform, and secured at the opposite end to the car-body in any appropriate manner. This sliding door can be moved to a position directly in front of the steps G, thereby cutting off all egress from or access to the car, or can be moved back, so as to occupy a position close to the car-body, where it is out of the way and detracts but little from the general neat appearance of the car.

It will be understood that there is to be a sliding door on each side of the car.

These safety-doors may be hung or supported to or by the car-body in any other suitable manner, if desired, it simply being necessary that the said doors shall move to a position to obstruct or open the passage-way from the car or platform to the ground or station-platform.

In order that the sliding doors of all the cars of a train may be closed and opened simultaneously, I secure to one edge of each door a plunger, H, adapted to a cylinder, I, secured to the side of the car-body, a pipe, J, forming a communication between the end of the cylinder and a pipe, K, beneath the body of the car, this pipe K terminating in a flexible tube, M, provided with a coupling, so that the pipes of all the cars may be coupled together and communicate with an air-pump on the engine or tender. When there is air under pressure, or it may be water under pressure, in the pipes, it will act on the plunger H and close the doors, all the doors of all the cars being simultaneously closed; but when the pressure is removed each door will be opened by a counterbalance-weight, *h*, contained in a tube, *i*, a cord or chain to which the weight is suspended passing over a pulley and being secured to the edge of the door.

Figure 3:
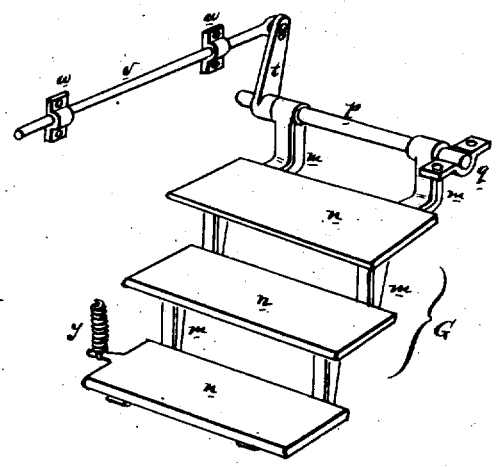

The above-described features of my invention may be applied to ordinary cars without any change in the construction of the steps; but in making new cars I prefer to make the steps as shown in Figs. 2 and 3, in which arms *m m* carry the treads *n* of the steps, the arms being secured to a shaft, *p*, which has one bearing, *q*, on the under side of the platform, and another bearing attached to the body of the car. An arm, *t*, on the shaft is connected to a bolt, *v*, which is arranged to slide in attachments *w* on the end of the car. A spring, *y*, connected at the lower end to the steps and at the upper end to any fixed object, tends to maintain the steps in the position shown in Fig. 2; but the weight of any person on the steps will depress the same to an extent permitted by a bar, $y'$, and this movement of the steps will cause the bolt to be so far moved outward that it will project in front of the door. When the latter has been opened, therefore, permitting passengers to enter or leave the car, it cannot be accidentally closed while a passenger is on the steps.

I do not limit myself to any particular mechanism for operating the doors, but in all cases there would have to be a cylinder and piston or their equivalent.

I claim as my invention—

1. The combination of the body, platform, and steps of a car with a sliding door, F, constructed to be moved to a position in front of or away from the steps, substantially as set forth.

2. The combination of the body, platform, and steps of a car, and the counterbalanced sliding door F, with a plunger, H, and cylinder I, and with pipes, through which air or water under pressure may be introduced into the cylinder, all substantially as specified.

3. The combination of the body and platform of a car, and the sliding door F, and bolt $v$, with yielding steps G and mechanism whereby the movement of the steps is imparted to the bolt, substantially as described.

4. A car-body having one or more platforms or floors from which the passengers enter or leave the car, in combination with one or more safety-doors, adapted to be moved in front of or away from said platforms to prevent or enable the passage of the passengers, and mechanism, substantially as described, operating by an aeriform or fluid medium under pressure to actuate said safety door or doors, substantially as and for the purpose specified.

5. A car-body having one or more platforms or floors from which the passengers enter or leave the car, in combination with one or more safety-doors, adapted to be moved in front of or away from said platforms to prevent or enable the passage of the passengers, and mechanism, substantially as described, operating by an aeriform or fluid medium under pressure to actuate said safety door or doors, the mechanism for operating all of the doors being connected to the same source of power, whereby they all act simultaneously, substantially as and for the purpose specified.

6. A car having one or more safety-doors to prevent the egress of passengers except at the proper time, in combination with mechanism operating by an aeriform or fluid medium under pressure to operate said door, and pipes extending from one end of the car to the other communicating with said mechanism and adapted to be coupled with a supply-pipe on another car, substantially as and for the purpose specified.

7. A car provided with a safety-door to prevent the egress of passengers except at the proper time, in combination with suitable mechanism for operating said door from the locomotive or tender, substantially as and for the purpose specified.

8. A car-body provided with a movable door to close or open to the passage-way from the car, in combination with a locking device and a support over which the passenger walks, whereby the weight of the passenger automatically locks the opened door, preventing its being closed until he has passed the door, substantially as and for the purpose specified.

In testimony of which invention I hereunto set my hand.

FRANK LAPPIN.

Witnesses:
R. M. HUNTER,
E. M. BRECKINREED.